(12) United States Patent
Ripy et al.

(10) Patent No.: US 7,408,951 B1
(45) Date of Patent: Aug. 5, 2008

(54) METHOD FOR TRANSMITTING DATA (75) Inventors: Paul B. Ripy, Laurens, SC (US); Paul E. O'Connor, Grass Valley, CA (US); Shuo Huang, Novato, CA (US)

(73) Assignee: Tellabs Petaluma, Inc., Naperville, IL (US)

( * ) Notice: Subject to any disclaimer, the term of this patent is extended or adjusted under 35 U.S.C. 154(b) by 782 days.

(21) Appl. No.: 10/842,840

(22) Filed: May 10, 2004

Related U.S. Application Data (60) Provisional application No. 60/537,825, filed on Jan. 20, 2004.

(51) Int. Cl.
*H04L 12/66* (2006.01)

(52) U.S. Cl. .......................................... 370/463; 710/52

(58) Field of Classification Search ................. 370/307, 370/463; 725/68, 131, 151; 711/217; 710/52–57, 710/310
See application file for complete search history.

(56) References Cited

U.S. PATENT DOCUMENTS

| 3,824,597 | A | * | 7/1974 | Berg | ........................... 370/215 |
| 5,515,371 | A | | 5/1996 | Venters | |
| 6,490,296 | B2 | | 12/2002 | Shenoi et al. | |
| 6,496,502 | B1 | | 12/2002 | Fite, Jr. et al. | |
| 6,789,180 | B1 | * | 9/2004 | Rezeanu | ..................... 711/217 |
| 7,024,685 | B1 | * | 4/2006 | Foster et al. | ................. 725/151 |

\* cited by examiner

*Primary Examiner*—Seema S. Rao
*Assistant Examiner*—Wanda Z Russell
(74) *Attorney, Agent, or Firm*—Hamliton, Brook, Smith & Reynolds, P.C.

(57) ABSTRACT

Communications equipment includes a demultiplexer that controllably delivers portions of the data to buffers in a particular order, a logic circuit that selectively controls the transmission of the data from the buffers such that a transmission order of the data portions is preserved, and transmission circuits, each in communication with at least one of the buffers. A method of transmitting data is further disclosed.

36 Claims, 6 Drawing Sheets

| Previous mask | Previous read | Next mask |
|---|---|---|
| 0000 | 0000 | 0000 |
|  | 0001 | 0001 |
|  | 0011 | 0011 |
|  | 0111 | 0111 |
|  | 1111 | 0000 |
| 0001 | 0000 | 0001 |
|  | 0010 | 0011 |
|  | 0110 | 0111 |
|  | 1110 | 0000 |
| 0011 | 0000 | 0011 |
|  | 0100 | 0111 |
|  | 1100 | 0000 |
| 0111 | 0000 | 0111 |
|  | 1000 | 0000 |

Fig. 5

| Frame number | Cells pushed to master FIFOs | Mask value | Master FIFOs content | | | | Cells on DSD lines | | | | Cells received in slave FIFOs | | | | Cells sent to ATM queues |
|---|---|---|---|---|---|---|---|---|---|---|---|---|---|---|---|
| | | | #0 | #1 | #2 | #3 | #0 | #1 | #2 | #3 | #0 | #1 | #2 | #3 | |
| 1 | C1 | 0000 | C1 | E | E | E | C1 | – | – | – | C1 | – | – | – | C1 |
| 2 | C2,C3 | 0001 | E | C2 | C3 | E | – | C2 | C3 | – | – | C2 | C3 | – | C2, C3 |
| 3 | C4,C5,C6 | 0111 | C5 | C6 | E | C4 | – | – | – | C4 | – | – | – | C4 | C4 |
| 4 | C7,C8 | 0000 | C5 | C6 | C7 | C8 | C5 | C6 | C7 | C8 | C5 | C6 | C7 | C8 | C5,C6,C7,C8 |
| 5 | C9 to C12 | 0000 | C9 | C10 | C11 | C12 | C9 | C10 | C11 | C12 | C9 | C10 | C11 | C12 | C9,C10,C11,C12 |
| 6 | C13 | 0000 | C13 | E | E | E | C13 | – | – | – | C13 | – | – | – | C13 |
| 7 | C14 to C17 | 0001 | C17 | C14 | C15 | C16 | – | C14 | C15 | C16 | – | C14 | C15 | C16 | C14,C15,C16 |
| 8 | | 0000 | C17 | E | E | E | C17 | – | – | – | C17 | – | – | – | C17 |

Fig. 6

METHOD FOR TRANSMITTING DATA

RELATED APPLICATIONS

This Application claims priority to now expired U.S. Provisional Patent Application Ser. No. 60/537,825, filed Jan. 20, 2004, incorporated by reference herein in its entirety. This Application is related to U.S. patent application Ser. No. 10/738,283 filed Dec. 17, 2003 entitled "Centralized, Double Bandwidth, Directional, Shared Bus Communications Architecture" by inventors Paul Brian Ripy, Paul Edwin O'Connor and Amar Mohammed Othman, which application issued as U.S. Pat. No. 7,065,593 on Jun. 20, 2006, and which application is incorporated by reference herein in its entirety.

FIELD OF THE INVENTION

This invention relates generally to network communications.

DESCRIPTION OF THE RELATED ART

High bandwidth communications to the home can include Digital Subscriber Line (DSL), Voice over Internet Protocol (VoIP) and video services. Much of the existing communications access equipment has insufficient bandwidth for such broadband services.

The inventors have identified that there is a benefit to providing methods and devices for increasing a bandwidth transmittable over a given piece of communication equipment. In particular, such methods and equipment may find a use, for example, in so-called "last mile" applications, i.e., delivery of network services to homes or businesses.

SUMMARY

A communications device according to one embodiment of the invention includes a plurality of buffers, each configured to receive and store data, and a demultiplexer configured to distribute consecutive portions of a data signal among the plurality of buffers in a predetermined order. The device also includes a logic circuit configured to output a mask signal. The mask signal is based on a previous state of the mask signal, and each of the buffers is configured to output a stored portion of the data signal according to a corresponding bit of the mask signal.

A communications device according to another embodiment of the invention includes a plurality of buffers, each configured to receive and store data, and a demultiplexer configured to distribute consecutive portions of a data signal among the plurality of buffers in a predetermined order. The device also includes a logic circuit configured to output a mask signal. The mask signal is based on a previous output state of the plurality of buffers, and each of the buffers is configured to output a stored portion of the data signal according to a corresponding bit of the mask signal.

A method of transmitting data according to a further embodiment of the invention includes distributing consecutive portions of a data signal among a plurality of buffers in a predetermined order, storing each of the distributed portions in the respective buffer, and outputting a mask signal. The method also includes outputting each of the stored portions according to a corresponding bit of the mask signal, where the mask signal is based on a previous state of the mask signal.

Another embodiment of the present invention includes a machine-readable medium encoded with machine-executable instructions comprising a method for transmitting data as described herein.

DETAILED DESCRIPTION

Figure 1:
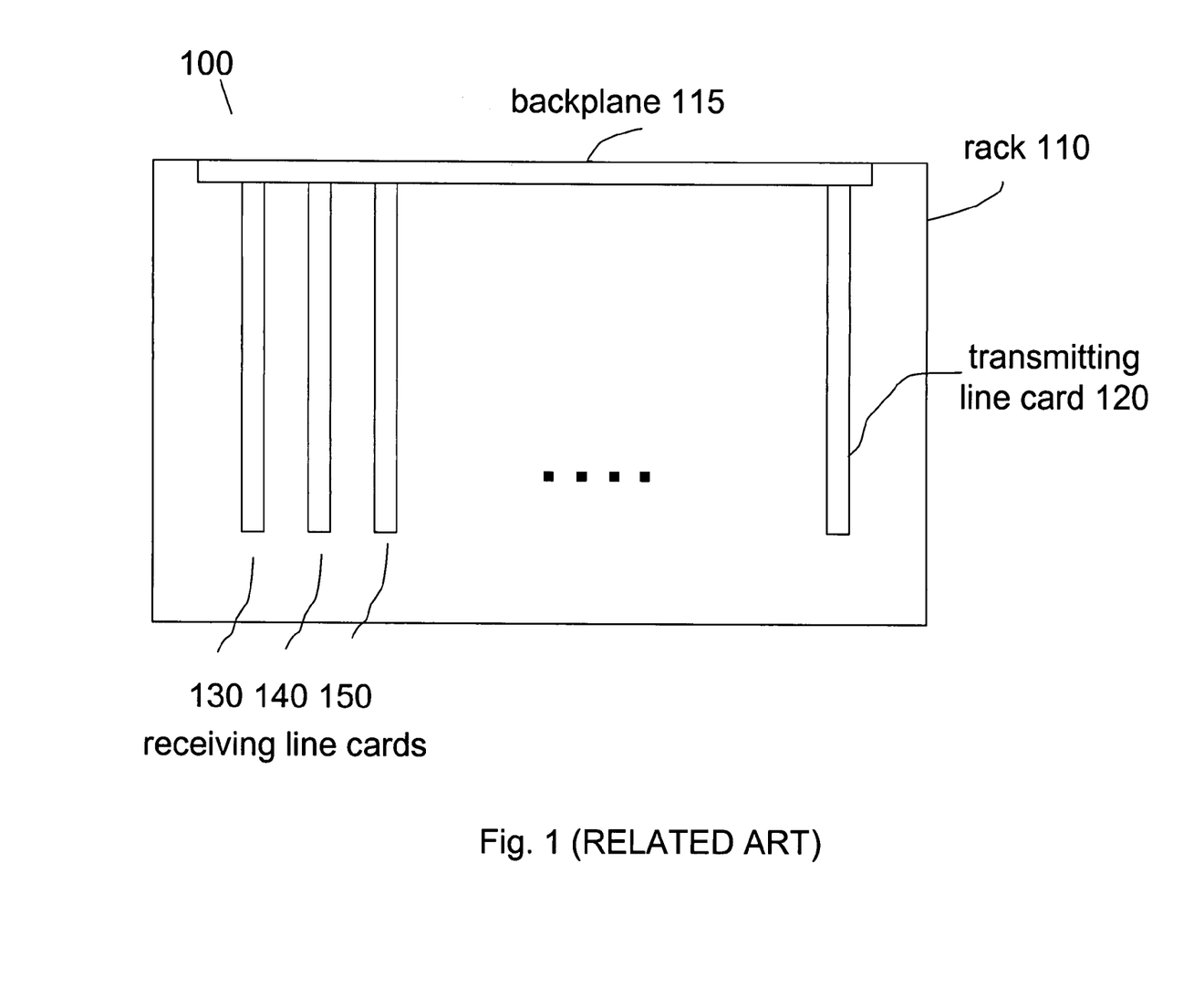
FIG. 1 is a schematic of a piece of communications access equipment showing a backplane, a transmitting line card, and receiving line cards.

FIG. 1 is a schematic of a typical piece of communications access equipment (device 100) that includes a rack 110 with a backplane 115 into which a number of cards 120, 130, 140 and 150 may be plugged. In one example, a transmitting line card 120 contains one or more transmitting circuits and several receiving line cards 130, 140, 150 that each contain one or more receiving circuits are used. Backplane 115, transmitting line card 120 and receiving line cards 130, 140, 150 are all shown in schematic edge view.

In general, backplane 115 is integral with the rack 110 in the communications access equipment 100 and cannot easily be removed from it. By contrast, transmitting line card 120 and receiving line cards 120, 130, 140 and 150 are generally easily snapped or otherwise fastened into backplane 115 (for example, at their back and/or bottom edges) using known technology (e.g. an insertion and/or snap attachment mechanism, not shown in the figure) so that the line cards can be easily removed and replaced with upgraded transmitting line cards and upgraded receiving line cards, as they become available.

In a typical example, the backplane 115 has bus circuitry (for example, metallized lines such as copper traces) that may have a particular transmission bandwidth. For example, in certain commonly available cards, the backplane 115 circuits have a nominal ability to transmit signals of up to 150 Mbps (which corresponds roughly to OC-3 at 155.52 Mbps). One way to exceed this limitation and to attain an upgraded system of, for example, 600 Mbps (corresponding roughly to OC-12 at 622.08 Mbps) would be to multiplex the ATM cell flow into four parallel ATM cell flows and pass each of these ATM cell flows into one of four respective buses arranged on the backplane, for example, in parallel. (Although the foregoing example describes four lines (N=4), in general any value of N>1 is possible.)

Several issues arise that may render a simplistic parallel multiplexing scheme undesirable. Simply replacing a single backplane metallized line or bus by N metallized lines or buses in parallel does not guarantee a increase of bandwidth by a factor of N, particularly when used with bursty traffic sources such as, for example, ATM networks. Likewise, in certain communications systems or applications, it may be desirable or even necessary that a sequence of data packets is ultimately received in the same order as originally transmitted. Referring, by way of example, to FIG. 1, it may be required in some applications that a sequence of ATM cells entering transmit line card 120 is the same sequence of ATM cells that will exit receive line card 130. Such an ATM sequence requirement may cause problems in practice with ATM cell flows proceeding along N backplane metallized lines.

Figure 2:
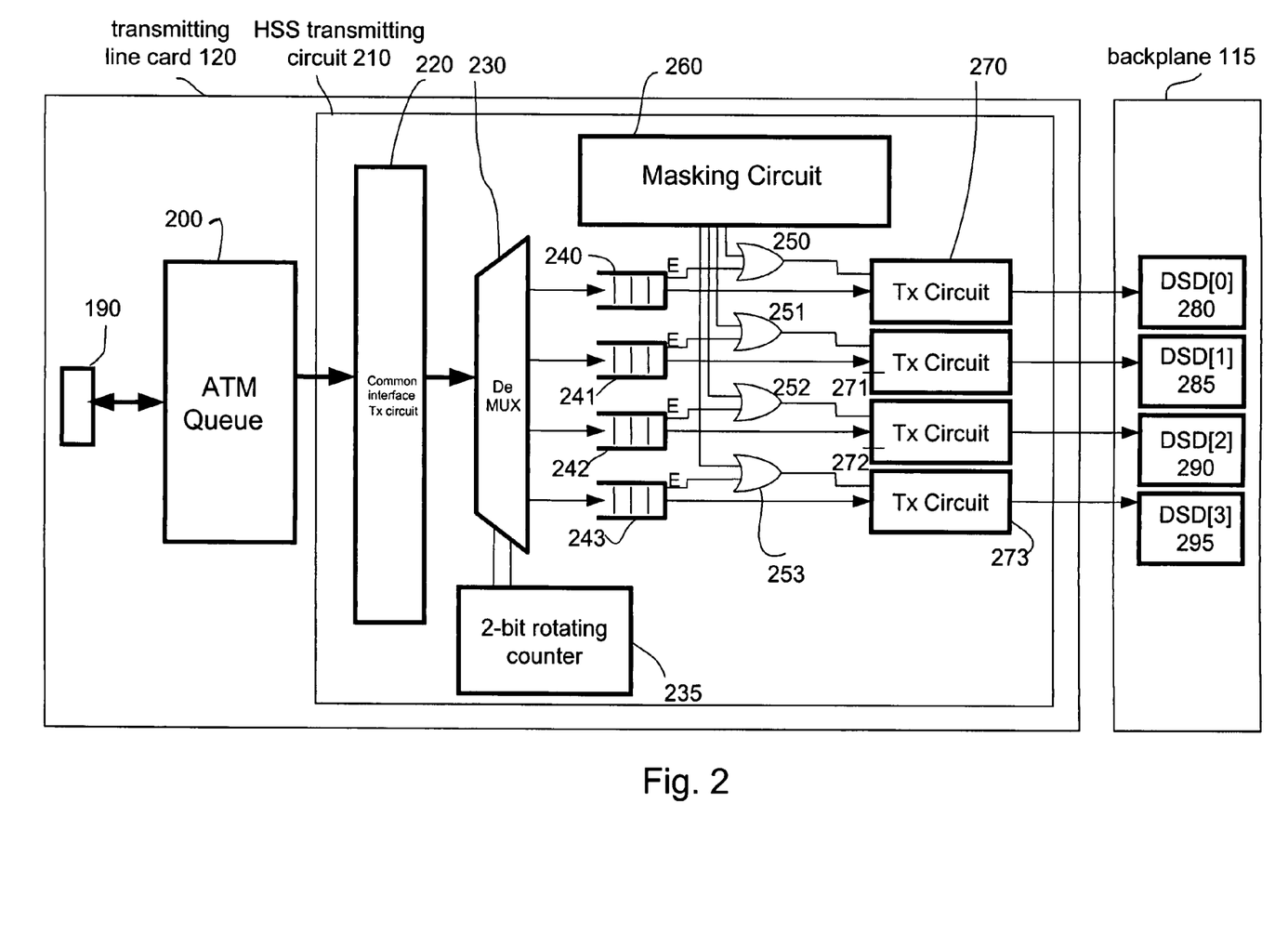
FIG. 2 is a schematic of a transmitting line card in accordance with an embodiment of the present invention.

FIG. 2 shows a schematic of a transmitting line card 120 that can be employed in an embodiment of the present invention. The transmitting line card 120 is configured and arranged to provide a downstream data signal DSD (e.g. a serial data flow) to each of several buses in backplane 115. In one example, the card 120 has contacts with the capability of contacting N backplane metallized lines of backplane 115 in parallel and of thereby increasing the potential bandwidth of communications access equipment 100 by a factor of N (where N can be, for example, four).

FIG. 2 shows an example of a transmitting line card 120 that includes circuits 190 (not directly relevant to the operation of the present invention), an ATM queue 200, and a high speed serial (HSS) transmitting circuit 210 that may contain various additional circuit elements as described herein.

In an example of an embodiment of the invention, the data flow proceeds as follows. ATM cells enter HSS transmitting circuit 210 from ATM queue 200. HSS transmitting circuit 210 includes a common interface transmitting circuit 220 that receives a stream of ATM cells from ATM queue 200 and has an output that is, for example, 32 bits wide (i.e. one data word). The common interface 220 is in turn connected to a 1×4 (i.e. 1×N) demultiplexer 230. A two-bit (i.e. $\log_2$N-bit) rotating (or modulo) counter 235 provides a control input to demultiplexer 230. The rotating counter 235 may be a mechanical device, or more likely, an electrical or clocked electronic device that simulates the cyclic response of a mechanical rotating counter. As may be understood, more counter bits would allow for selection between a greater number of circuits than four.

Exiting the demultiplexer 230, the ATM cells consecutively flow into FIFO buffers FIFO_0 240, FIFO_1 241, FIFO_2 242, and FIFO_3 243 where they accumulate. In this example, each FIFO has a data output and a control output E that is asserted to indicate that the FIFO is empty (an "empty flag"). For the purposes of simplifying the following discussion, we may consider only FIFO_0 240.

Masking circuit 260 (which may be implemented as a logic circuit including an array of logic elements) is configured in this example to output N mask signals, each corresponding to one of the N FIFO buffers. When a mask signal is true, it masks the corresponding FIFO's empty flag (in this example, via a corresponding OR gate 250-253) such that a subsequent circuit sees the FIFO as being empty even if it is not. The output of the OR gate is then transmitted to the subsequent circuit in place of the empty flag. When a mask signal is false and the corresponding FIFO (e.g. FIFO_0 240) is not empty, a corresponding transmitting (Tx) circuit 270 allows ATM cell flow from the FIFO_0 240 via a transmission channel to a corresponding downstream data line DSD[0] 280. Likewise, other ATM data from the other three FIFOs flows into three other corresponding transmission channels yielding three other streams of downstream data, DSD[1] 285, DSD[2] 290, and DSD[3] 295 that are communicated along their three other respective circuits in backplane 115.

Figure 3:
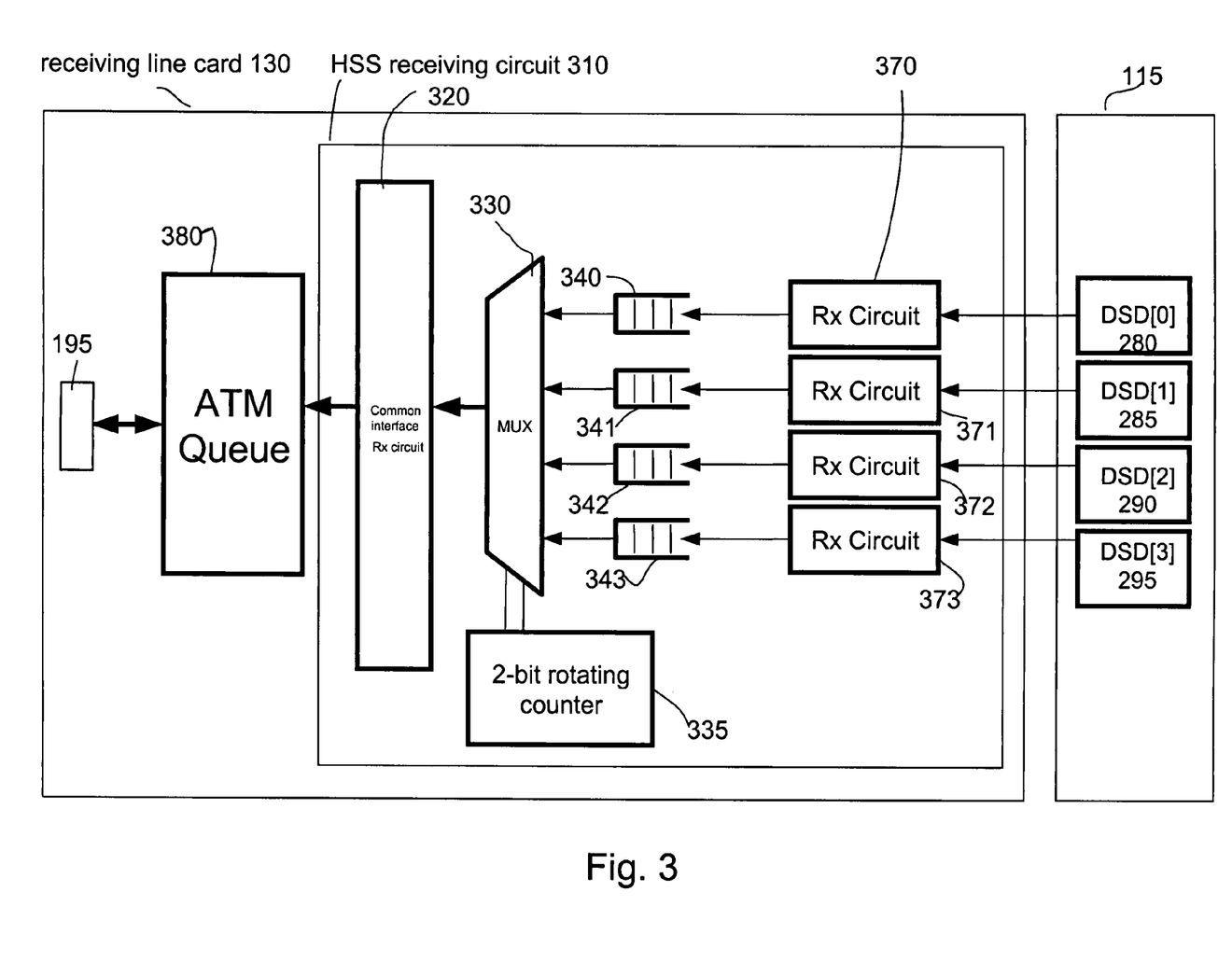
FIG. 3 is a schematic of a receiving line card in accordance with an embodiment of the present invention.

In a similar manner, the process of data flow shown on the transmitting side is reversed on the receiving side. FIG. 3 shows a receiving line card 130 which comprises circuits 195 (not directly relevant to the operation of the present invention), an ATM queue 380, and a high speed serial (HSS) receiving circuit 310. Data flow proceeds as follows (in this example, N=4). Serial data flows DSD[0] 280, DSD[1] 285, DSD[2] 290 and DSD[3] 295 originating from the N circuits (e.g., metallized lines or buses) of the backplane 115 are sent to appropriate receiving (Rx) circuits 370, 371, 372 and 373. In each of the receiving circuits 370, 371, 372 and 373 the serial data is changed into, for example, 32-bit word format and then pushed to the appropriate one of the N FIFOs 340, 341, 342, and 343. When the FIFOs are not empty, ATM cells from the four FIFOs are N×1 multiplexed in multiplexer 330 where they are combined into a single ATM cell stream and sent into a common interface receiving circuit 310 and then on to ATM queue 380 and eventually to circuits 195.

A comparison of transmitting line card 120 in FIG. 2 with receiving line card 130 in FIG. 3 shows that transmitting line FIFO buffers 240, 241, 242 and 243 may be similar to receiving line FIFO buffers 340, 341, 342 and 343 and that transmitting circuits 270, 271, 272 and 273 may be similar to receiving circuits 370, 371, 372 and 373. However, masking circuit 260 is not present in this embodiment of receiving line card 130. In this example, transmitting demultiplexer 230 and receiving multiplexer 330 are synchronized.

Figure 4:
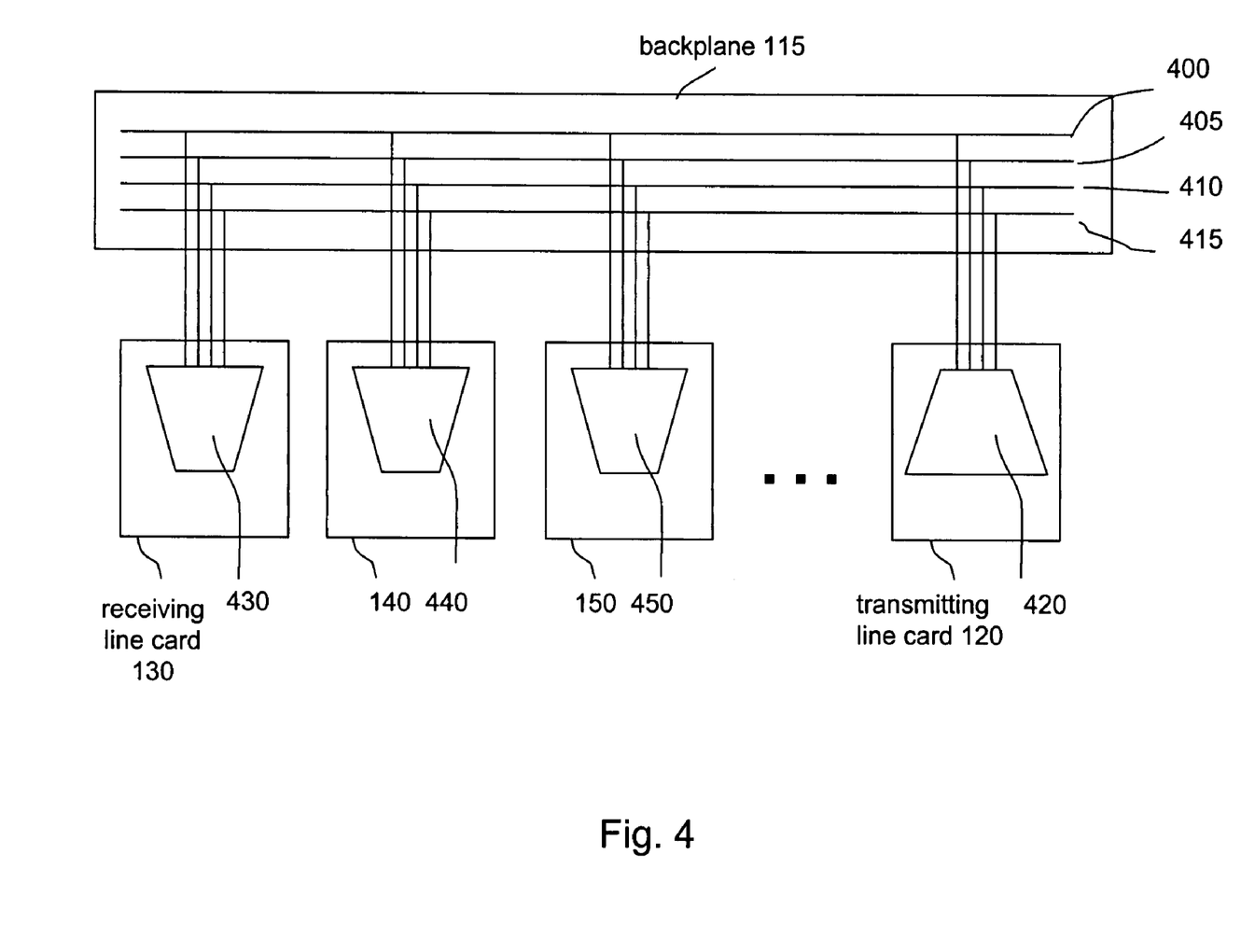
FIG. 4 is a schematic diagram of an example of an electrical connection of a backplane, a transmitting line card, and receiving line cards in accordance with an embodiment of the present invention.

Electrical connection between backplane 115, transmitting line card 120, and receiving line cards 130, 140 and 150 can be seen by referring to FIG. 4 which shows a section of backplane 115 comprising four metallized lines 400, 405, 410 and 415. A transmitting line card 120 contains transmitting line card circuitry 420 which schematically encompasses, for example, all the transmitting line circuitry shown in FIG. 2. Likewise, a receiving line card 130 contains receiving line card circuitry 430 which schematically encompasses, for example, all the receiving line circuitry shown in FIG. 3. As shown in FIG. 4, four electrical connections are made between transmitting line card circuitry 420 and each of the four metallized lines 400, 405, 410 and 415. Four electrical connections are also made between receiving line card circuitry 430 and each of the four metallized lines 400, 405, 410, and 415. In addition, four similar electrical connections are made between each of receiving line card circuitry 440, 450 and each of the metallized lines 400, 405, 410 and 415. Similar electrical connections may be made to additional receiving line cards (shown schematically by the ellipsis), so that one transmitting line card is arranged to pass ATM cell flow to a line card which can be selected from several or even many receiving line cards.

Control as to which receiving line card gets the ATM cell flow in metallization lines 400, 405, 410 and 415 can be implemented in receiving line circuitry 430, 440 and 450 of the respective receiving line cards 130, 140 and 150. Transmitting line card 120 may be called a master card, and all receiving line cards (of which only 130, 140 and 150 are shown) may be called slave cards, for the purposes of this description.

In this embodiment, temporal order is preserved from ATM cells incident on transmitting line card 120 to ATM cells exiting receiving line cards 130, 140, 150. The procedure that preserves this temporal order using equipment as described herein and as shown in FIGS. 2-4 can be referred to as a bonding method and is described below. The bonding method involves a circuit which is implemented in, for example, a Pathfinder 1 ASIC (available from Advanced Fibre Communications of Petaluma, Calif.). One such bonding method is reviewed in detail below.

Considering FIFO_0 240 of FIG. 2, note that the arrival rate of the ATM cells transferred into FIFO_0 240 may not be the same as the rate of ATM cells transferred out from FIFO_0 240 and into HSS transmitting channel circuit 270. If the arrival rate is too high, FIFO_0 240 can become full, and common interface transmitting circuit 220 will stop requesting cells from ATM queue 200. If the arrival rate is too low, FIFO_0 240 can become empty. If FIFO_0 240 is empty at the time the transmitting circuit 270 is to start a new frame and needs a cell to send, transmitting circuit 270 will insert an idle cell to transmit instead of getting data from FIFO_0 240. In one example, an idle cell is a cell filled with all zeros, although an idle cell may have any contents that can be recognized as idle by a subsequent receiving circuit.

The bonding method can be described by following the ATM cell flow in FIG. 2, beginning with ATM cells being sequentially directed by multiplexer 330 into four FIFOs. The first cell is entered in FIFO_0 240, the second cell in FIFO_1 241, the third cell in FIFO_2 242, and the fourth cell in FIFO_3 243. For clarity in the following discussion, the reference numerals 240, 241, 242, and 243 that are used in the figures. To refer to the four FIFO's will be suppressed, and the FIFO's 240, 241, 242 and 243 will simply be called FIFO_0, FIFO_1, FIFO_2 and FIFO_3.

After one cycle, the fifth cell is directed into FIFO_0 again, the sixth cell into FIFO_1, etc. Note that in this embodiment, writes to the FIFOs are performed one cell to one FIFO at a time (in another embodiment, writes to the FIFOs may be performed M cells to a FIFO at a time). Reads from the FIFO, however, can be performed one word (in another embodiment, M words) at a time from all N FIFOs. If the write rate is lower than the read rate, some or all the FIFOs can empty. At another time, there may be a burst of writes so that some or all of the FIFOs can fill.

Such a data flow may be controlled in an orderly fashion such that if FIFO_A becomes non-empty after another FIFO_B, then FIFO_A will not be read before FIFO_B. In such a case, masking circuit 260 controls the FIFO output flow so that earlier cells are emptied before later cells are sent to the respective transmitting circuits 270, 271, 272 and 273.

At the end of each ATM frame, masking circuit 260 monitors which FIFOs sent cells to the corresponding transmitting circuits. Based on this information, it determines which FIFOs will be "masked" during the next frame. The table in FIG. 5 shows the logic of a masking circuit according to one embodiment.

Figure 5:
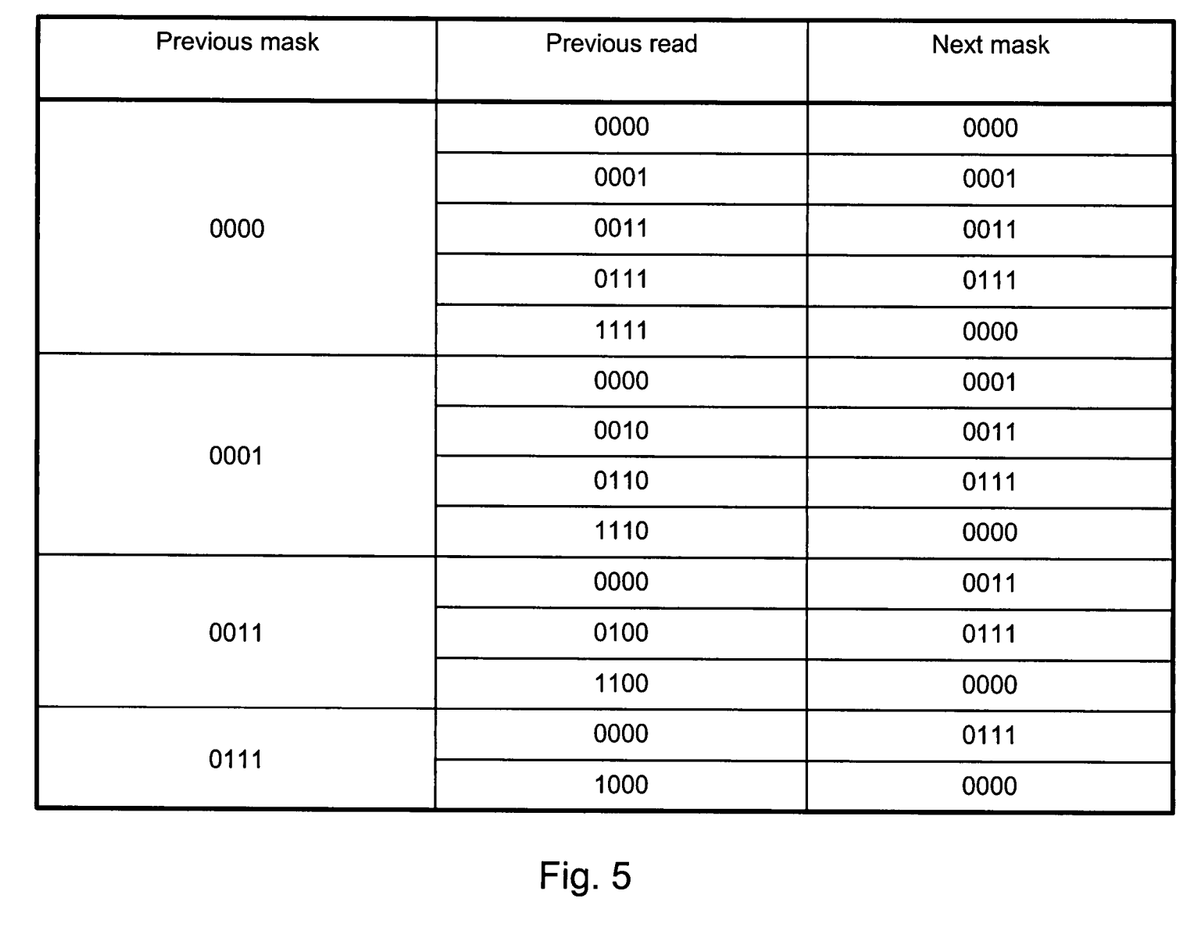
FIG. 5 shows a logic of a masking circuit according to an embodiment of the invention.

The first and third columns of the table in FIG. 5 refer to the states of the previous mask and the next mask, respectively. The second column refers to the previous read state which is a diagnostic that determines if the data was sent or not during the previous cycle. There are N digits in each cluster, each digit corresponding to the state of a particular FIFO buffer. In this example, the first digit on the right of the cluster corresponds to FIFO_0, the second to FIFO_1, and so on. For mask states in the first and third columns, a "1" means the corresponding FIFO is masked (to show "always empty"), and a "0" means the corresponding FIFO is not masked so that ATM cell data can pass on to the appropriate transmitting circuit. For previous read states in the second column, a "1" means the FIFO sent data to the corresponding transmitting circuit, and a "0" means the FIFO did not send data to the corresponding transmitting circuit (either because the FIFO was empty or because the FIFO was masked). The cluster of N digits in the read state represent N channels in a similar way. The first digit on the right corresponds to FIFO_0, etc.

For example, a mask pattern "0001" means that FIFO_0 is masked, while FIFO_1, FIFO_2 and FIFO_3 are not masked. A previous read pattern "00010" means that FIFO_0 sent an ATM cell to the transmitting circuit during the previous cycle, while FIFO_1, FIFO_2 and FIFO_3 did not. For larger numbers of channels, the read state may simply be represented by a larger number of digits.

Idle cells are used for keeping track of data flow and are generated by HSS transmitting circuit 210 when either the corresponding FIFO is empty or its mask shows a "1". The idle cells are subsequently rejected in HSS receiving circuit 320 of the receiving (slave) line card 130. The above procedure helps to ensure that cells exiting the HSS receiving circuit in the receiving (slave) line card have the same order as when they entered the FIFOs of the transmitting (master) line card. When no line card is driving the circuits 400, 405, 410, or 415, they are pulled to a default logic level, for example via pull-up or pull-down resistors (not shown). As a result, receiving (slave) line card 130 sees the circuits remain at logic 0, and thus reads equivalent idle cells into the circuit. When transmit (master) line card 120 is in the reset state, it may also put all logic "0" onto these lines. The transmitting line card produces idle cells when it does not have ATM cells to send, and these idle cells appear in the appropriate receiving line card.

It may be desirable or even necessary to synchronize the operations of the demultiplexer 230 in the master line card and the multiplexer 330 in the slave line card. As used herein, a master circuit is another name for transmitting line card circuitry 420 and a slave circuit is another name for circuitry of one of the receiving line cards 430, 440, 450. In one example, initially both master and slave circuits are in the reset states so that the counters are at a predetermined value (e.g. 0). Then, in this example, the slave circuit is activated first. At this time, all the FIFOs are empty. At the start of the next frame, idle cells are sent from the master transmit circuit 270 (or 271, 272, 273), since no real cells have been sent into the FIFOs yet.

Then the master circuit is activated (e.g. by the user). The first cell from the ATM queue goes to the FIFO_0, since the rotating counter was at 0 after reset. This cell is then put onto DSD[0] 280. As the result, at the receiving side, the first real cell comes from FIFO_0. Such an operating sequence ensures that the receive side gets only idle cells before receiving the first real cell, thus synchronizing the demultiplexer 230 and multiplexer 330. Such operation is illustrated in the detailed example shown in the table in FIG. 6, which shows an example of transferring cells with a bonding method in accordance with an embodiment of the present invention.

Figure 6:
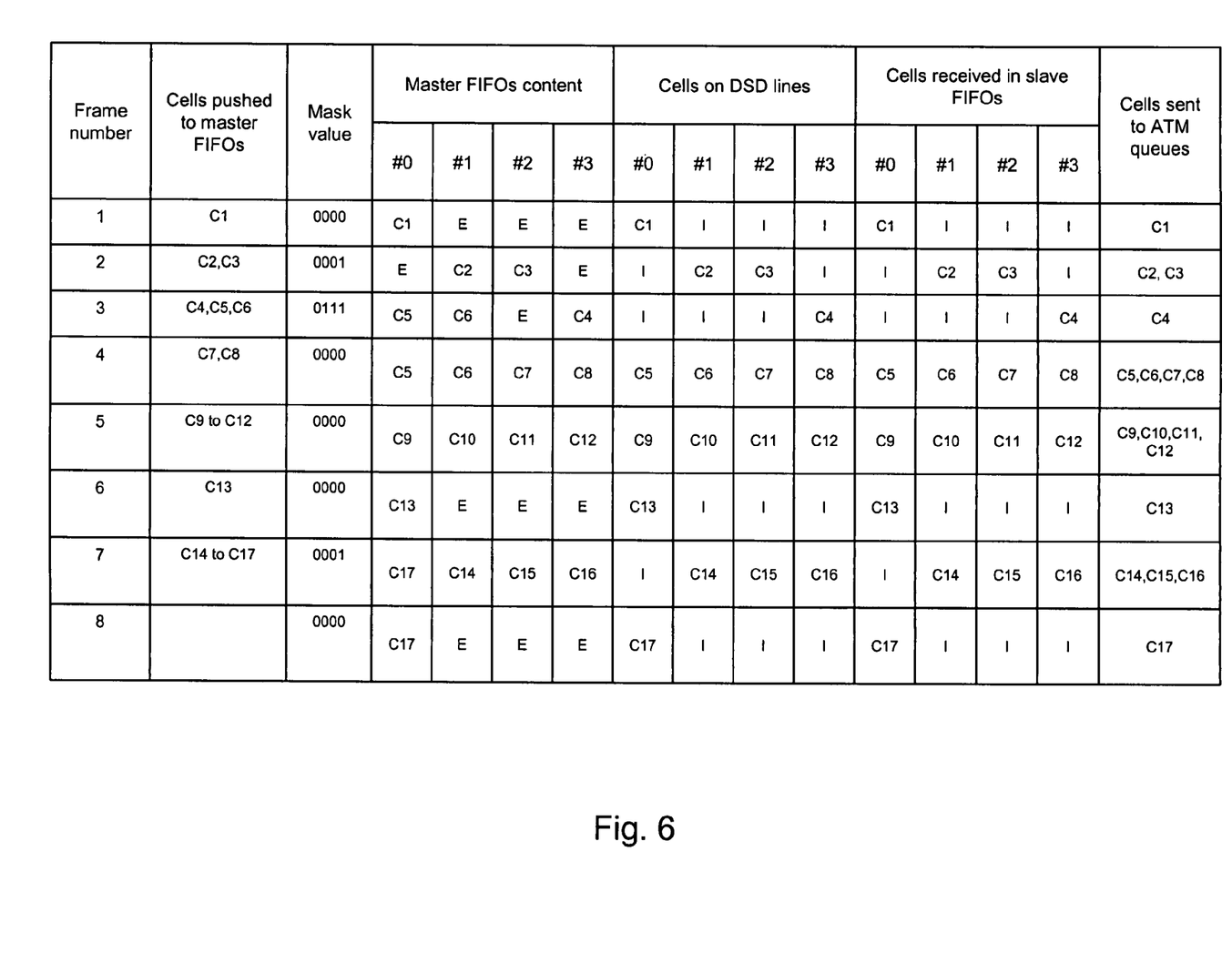
FIG. 6 shows an example of transferring cells under a bonding method according to an embodiment of the invention.

In this table, E refers to an empty FIFO and I refers to an idle cell. In frame 1, the mask is 0000 and cell C1 is pushed in FIFO_0 which corresponds to line (DSD) 0. Circuits 271, 272 and 273 send idle cells on lines 1 to 3. When these cells are received at receive circuit they are all pushed to the FIFOs (340 to 343). When these cells are popped out from the FIFOs at the common interface circuit 320, the 3 idle cells are dropped and only C1 is sent to receive ATM queue 380.

In the second frame, the mask becomes 0001 (i.e. following the logic as shown in the table of FIG. 5). Cells C2 and C3 are added to the master FIFOs and are sent to the slave FIFOs. Note that since the mask value was set at 0001, it stops any cell exiting from FIFO_0 during this frame.

In frame 3, the mask becomes 0111 (i.e. following the logic as shown in the table of FIG. 5). Three new cells C4, C5, C6 are in the master FIFOs. Because the mask is 0111, only the cell from FIFO_3 can be sent (cell C4).

In frame 4, the mask becomes 0000 (i.e. following the logic as shown in the table of FIG. 5). Cells C7 and C8 are new in the master FIFOs. Because the mask is 000, all cells C5, C6, C7 and C8 are sent.

This bonding process is repeated for other examples in other frame numbers 5,6,7,8 of the table in FIG. 6. Note that cells sent to the ATM queues in the slave side are in the same order as they came out of the ATM queues of the master side, so that the ATM cell order may be preserved.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

For example, embodiments of the invention also include circuits having one or more arrays of logic elements (e.g. microprocessors, ASICs, FPGAs, or similar devices) configured to embody an apparatus as described herein and/or to perform a method as described herein. Embodiments of the invention also include data storage media (e.g. semiconductor memory (volatile or nonvolatile; SRAM, DRAM, ROM, PROM, flash RAM, etc.), magnetic or optical disks, etc.) storing one or more sets (e.g. sequences) of machine-executable instructions for performing such a method (or portion thereof).

In particular, reference is made herein to ATM networks and to particular terms associated therewith. Nonetheless, embodiments of the present invention may find use in other types of networks in which data is transferred in discrete packets.

The invention claimed is:

1. A communications device comprising:
   a plurality of buffers, each configured to receive and store data;
   a demultiplexer configured to distribute consecutive portions of a data signal among the plurality of buffers in a predetermined order; and
   a logic circuit configured to output a mask signal,
   wherein the mask signal is based on a previous state of the mask signal, and
   wherein each of the plurality of buffers is configured to output a stored portion of the data signal according to a corresponding bit of the mask signal.

2. The communications device according to claim 1, wherein the mask signal is based on a previous output state of each of the plurality of buffers.

3. The communications device according to claim 1, wherein the plurality of buffers is configured to output the stored portions in the same order as distributed by the demultiplexer.

4. The communications device according to claim 1, wherein each of the plurality of buffers is coupled to a corresponding one of a plurality of transmission circuits, and
   wherein each transmission circuit is configured to output a serial data signal including the corresponding outputted stored portion.

5. The communications device according to claim 1, wherein the demultiplexer comprises a counter and wherein the order of distribution is determined by an output of the counter.

6. The communications device according to claim 5, wherein the counter comprises a modulo counter.

7. The communications device according to claim 1, wherein the data signal comprises at least one ATM cell.

8. The communications device according to claim 1, wherein each of the plurality of buffers is configured to retain the stored portion when the corresponding bit of the mask signal has a first logical state, and
   wherein each of the plurality of buffers is configured to output the stored portion when the corresponding bit of the mask signal has a second logical state different than the first logical state.

9. The communications device according to claim 1, wherein each of the plurality of buffers is configured to hold m ATM cells, where m is an integer greater than zero.

10. The communications device according to claim 1, said device comprising a plurality of transmission channels, each channel corresponding to one of the plurality of buffers,
    wherein, onto each of the plurality of transmission channels, at least one of the corresponding buffer, the logic circuit, and a corresponding transmission circuit is configured to output a signal based on the stored portion when the corresponding bit of the mask signal has a first logical state, and to output an idle cell when the corresponding bit of the mask signal has a second logical state different than the first logical state.

11. The communications device according to claim 10, wherein, for each of the plurality of transmission channels, at least one of the corresponding buffer, the logic circuit, and the corresponding transmission circuit is configured to output an idle cell when the buffer is empty.

12. The communications device according to claim 1, said device comprising a multiplexer configured to output a second data signal comprising the outputted stored portions in the same order as distributed by the demultiplexer.

13. The communications device according to claim 12, said device comprising an ATM queue configured to receive a signal based on the second data signal.

14. The communications device according to claim 12, wherein the multiplexer comprises a counter.

15. The communications device according to claim 12, wherein each of the demultiplexer and the multiplexer includes a counter, and
    wherein an operation of the counter of the multiplexer is synchronized to an operation of the counter of the demultiplexer.

16. The communications device according to claim 1, said device comprising:
    a backplane comprising a plurality of transmission channels, each of the plurality of transmission channels corresponding to one of the plurality of buffers; and
    a plurality of card slots, each card slot being in electrical communication with the backplane and configured to conduct, for at least one of the plurality of buffers and to the corresponding transmission channel, a signal based on the outputted stored portion.

17. A communications device comprising:
    a plurality of buffers, each configured to receive and store data;
    a demultiplexer configured to distribute consecutive portions of a data signal among the plurality of buffers in a predetermined order; and
    a logic circuit configured to output a mask signal,
    wherein the mask signal is based on a previous output state of each of the plurality of buffers, and
    wherein each of the plurality of buffers is configured to output a stored portion of the data signal according to a corresponding bit of the mask signal.

18. The communications device according to claim 17, wherein the plurality of buffers is configured to output the stored portions in the same order as distributed by the demultiplexer.

19. The communications device according to claim 17, wherein each of the plurality of buffers is coupled to a corresponding one of a plurality of transmission circuits, and wherein each transmission circuit is configured to output a serial data signal including the corresponding outputted stored portion.

20. The communications device according to claim 17, wherein the demultiplexer comprises a counter and wherein the order of distribution is determined by an output of the counter.

21. The communications device according to claim 17, wherein each of the plurality of buffers is configured to retain the stored portion when the corresponding bit of the mask signal has a first logical state, and
wherein each of the plurality of buffers is configured to output the stored portion when the corresponding bit of the mask signal has a second logical state different than the first logical state.

22. The communications device according to claim 17, said device comprising a plurality of transmission channels, each channel corresponding to one of the plurality of buffers,
wherein, onto each of the plurality of transmission channels, at least one of the corresponding buffer, the logic circuit, and a corresponding transmission circuit is configured to output a signal based on the stored portion when the corresponding bit of the mask signal has a first logical state, and to output an idle cell when the corresponding bit of the mask signal has a second logical state different than the first logical state.

23. The communications device according to claim 17, said device comprising a multiplexer configured to output a second data signal comprising the outputted stored portions in the same order as distributed by the demultiplexer.

24. A method of transmitting data, said method comprising:
distributing consecutive portions of a data signal among a plurality of buffers in a predetermined order,
storing each of the distributed portions in the respective buffer;
outputting a mask signal; and
outputting each of the stored portions according to a corresponding bit of the mask signal,
wherein the mask signal is based on a previous state of the mask signal.

25. The method of transmitting data according to claim 24, wherein the mask signal is based on a previous output state of each of the plurality of buffers.

26. The method of transmitting data according to claim 24, wherein said outputting each of the stored portions comprises outputting the stored portions in the same order as distributed.

27. The method of transmitting data according to claim 24, wherein said outputting each of the stored portions further comprises outputting a serial data signal including the corresponding outputted stored portion.

28. The method of transmitting data according to claim 24, wherein said distributing is performed according to an output of a modulo counter.

29. The method of transmitting data according to claim 24, wherein the consecutive portions each comprise an ATM cell.

30. The method of transmitting data according to claim 24, wherein said outputting each of the stored portions comprises retaining the stored portion when the corresponding bit of the mask signal has a first logical state, and outputting the stored portion when the corresponding bit of the mask signal has a second logical state different than the first logical state.

31. The method of transmitting data according to claim 24, wherein said outputting each of the stored portions comprises outputting, onto each of a plurality of transmission channels, each channel corresponding to one of the plurality of buffers, a signal based on the stored portion when the corresponding bit of the mask signal has a first logical state; and outputting, onto each of the plurality of transmission channels, an idle cell when the corresponding bit of the mask signal has a second logical state different than the first logical state.

32. The method of transmitting data according to claim 31, wherein said outputting each of the stored portions comprises, for each of the plurality of transmission channels, outputting an idle cell when the buffer is empty.

33. The method of transmitting data according to claim 24, said method comprising:
receiving a signal based on the stored portions; and
outputting a second data signal comprising the received stored portions in the same order as distributed.

34. The method of transmitting data according to claim 33, said method comprising receiving the outputted stored portions,
wherein said receiving is synchronized to said distributing.

35. A machine-readable medium comprising machine-executable instructions for performing a method of transmitting data, said method comprising:
distributing consecutive portions of a data signal among a plurality of buffers in a predetermined order,
storing each of the distributed portions in the respective buffer;
outputting a mask signal; and
outputting each of the stored portions according to a corresponding bit of the mask signal,
wherein the mask signal is based on a previous state of the mask signal.

36. The medium according to claim 35, wherein the mask signal is based on a previous output state of each of the plurality of buffers.

* * * * *